United States Patent [19]

Tokura et al.

[11] Patent Number: 4,785,776

[45] Date of Patent: Nov. 22, 1988

[54] DIESEL ENGINE HAVING SHAPED FLAME DISPERSING RECESS IN PISTON CROWN

[75] Inventors: Naomi Tokura, Yokosuka; Toshiaki Tanaka, Fujisawa; Motohiro Shinzawa, Yokosuka, all of Japan

[73] Assignee: Nissan Motor Co., Ltd., Yokohama, Japan

[21] Appl. No.: 80,508

[22] Filed: Jul. 24, 1987

[30] Foreign Application Priority Data

Aug. 8, 1986 [JP] Japan .................................. 61-186205
Nov. 13, 1986 [JP] Japan ........................... 61-174591[U]

[51] Int. Cl.⁴ ........................ F02B 19/16; F02B 19/08
[52] U.S. Cl. .................................... 123/269; 123/262
[58] Field of Search ............... 123/262, 263, 269, 289, 123/290, 275

[56] References Cited

U.S. PATENT DOCUMENTS

| | | | |
|---|---|---|---|
| 2,113,711 | 4/1938 | Ricardo | 123/275 |
| 3,196,857 | 7/1965 | Zimmermann | 123/269 |
| 3,965,872 | 6/1976 | Taira et al. | 123/269 |
| 4,662,330 | 5/1987 | Shioyama et al. | 123/269 |

FOREIGN PATENT DOCUMENTS

| | | | |
|---|---|---|---|
| 1089588 | 9/1960 | Fed. Rep. of Germany | 123/269 |
| 138403 | 6/1974 | Japan . | |
| 59512 | 5/1979 | Japan . | |
| 78724 | 10/1980 | Japan . | |
| 97123 | 12/1980 | Japan . | |
| 174725 | 4/1981 | Japan . | |
| 8715 | 7/1983 | Japan . | |
| 61-1822 | 1/1986 | Japan . | |
| 930498 | 7/1963 | United Kingdom | 123/269 |
| 2151703 | 7/1985 | United Kingdom . | |

Primary Examiner—Tony M. Argenbright
Attorney, Agent, or Firm—Foley & Lardner, Schwartz, Jeffery, Schwaab, Mack, Blumenthal & Evans

[57] ABSTRACT

A piston crown is formed with cavity a which includes a first flame deflecting member which divides the flame ejected from a transfer port interconnecting a swirl chamber with a main combustion chamber while the piston is relatively close to its TDC position and a second flame deflecting arrangement which divides the flame flow after the piston has descended by a given amount. The stage deflections of the flame promotes extensive dispersion thereof and the formation of a flame plume which engulfs a relatively large amount of the air in the combustion chamber and improves mixing of the burning gases and unburnt fuel with the air in the combustion chamber.

21 Claims, 5 Drawing Sheets

DIESEL ENGINE HAVING SHAPED FLAME DISPERSING RECESS IN PISTON CROWN

BACKGROUND OF THE INVENTION

1. Field of the Invention

The present invention relates generally to a diesel engine and more specifically to a swirl or prechamber type diesel engine featuring a piston crown cavity which improves dispersion and mixing of the flame which is ejected from the swirl chamber.

2. Description of the Prior Art

Figure 1:
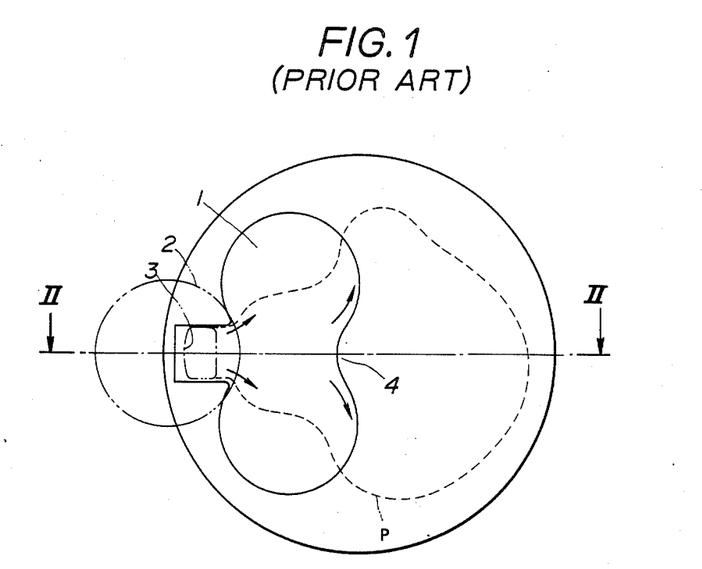
FIG. 1 shows a plan view of the prior art cavity arrangement discussed in the opening paragraphs of the instant disclosure.

FIG. 1 shows a so called "clover leaf" type flame dispersing cavity or recess arrangement 1 which is used in combination with swirl or pre-chamber type diesel engines such as disclosed in Japanese Utility Model pre publications Nos. 57-174725, 57-97123 and 58-8715.

With this type of engine, in order to lower the peak combustion temperature in the swirl chamber 2 and thus reduce the amount of NOx produced, a fraction of the injected fuel is released into the main combustion chamber prior to the spontaneous combustion of the main air-fuel charge in the swirl chamber.

However, in the absence of any strong turbulence or other mixing influence in the main combustion chamber, most of the fuel which is permitted to escape into the main combustion chamber tends to remain in or close to the trench portion 3 of the cavity. As the cavity 1 exerts only relatively weak dispersive influences on the flame which is ejected into the trench portion it tends to flow up and over the rounded nose portion 4 of the clover leaf type dispersion recess located opposite the trench 3. This induces the situation wherein the fuel in the trench portion tends to be entrained in a flame plume P having a shape essentially as indicated by the broken line.

Under these conditions the fuel which is released into the main combustion chamber tends to be carried by the initial flame ejection into a relatively cool section of the combustion chamber.

Accordingly, the relatively rich flame and the entrained fuel (particularly the latter) are not mixed effectively with the air available in the main combustion chamber and do not undergo sufficiently rapid and complete combustion to enable good engine output and low noxious emissions.

As a result of this phenomenon, during low load engine operation high HC exhaust emissions result while under high load smoke formation tends to be excessive.

SUMMARY OF THE INVENTION

It is an object of the present invention to provide an arrangement which promotes rapid spreading and blending of the flame which ejects from a diesel engine swirl or prechamber with the air and/or fuel in the associated main combustion chamber in a manner which promotes more efficient combustion and thus reduces smoke and HC emmissions.

In brief, in order to achieve the above object a piston crown is formed with a cavity which defines a first flame deflecting member which divides a flame ejected from a transfer port interconnecting a swirl chamber with a main combustion chamber while the piston is relatively close to its TDC position, and a second flame deflecting arrangement which divides the flame flow after the piston has descended by a given amount. The staged deflections improve the mixing of the flame and unburnt fuel with the oxygen rich air in the combustion chamber.

More specifically, a first aspect of the present invention comes in the form of an internal combustion engine which has a piston reciprocatively disposed in a bore in a manner to define a variable volume combustion chamber therein; a chamber into which fuel is supplied, the chamber being fluidly communicated with the combustion chamber by way of a transfer port; and wherein the piston features: a first flame deflecting surface defined in a cavity formed in the crown of the piston, the first flame deflecting surface being located in the path of a flame which is ejected from the transfer port while the piston is relatively close to its TDC position; a second flame deflecting surface, the second flame delfecting surface being defined in the cavity and located in the path of the flame after the piston has descended from its TDC position by a given amount.

A second aspect of the invention takes the form of an internal combustion engine which has a piston reciprocatively disposed in a bore to define a variable volume combustion chamber; a chamber into which fuel is supplied and which is fluidly communicated with the combustion chamber by a transfer port; and a cavity formed in the crown of the piston, the cavity featuring: a first flame deflecting surface, the first flame deflecting surface being located between the center of the piston and the location whereat the transfer port opens into the combustion chamber; and a second flame deflecting surface, the second flame deflecting surface being aligned with the location where the transfer port communicates with the combustion chamber and the first flame deflecting surface and more distal from the location than the first flame deflecting surface.

A third aspect of the present invention comes in the form of an internal combustion engine which has a piston reciprocatively disposed in a bore to define a variable volume combustion chamber; a chamber into which fuel is supplied, the chamber being fluidly communicated with the combustion chamber by way of a transfer port; and a cavity formed in the crown of the piston, the cavity featuring first and second shaped wall portions; a first flame deflecting surface, the first flame deflecting surface being located between the center of the piston and the location whereat the transfer port opens into the combustion chamber; first and second flame guides which form part of the first shaped wall portion, the flame guides being oriented inwardly to deflect the flame which has been deflected by the first flame deflecting surface back in toward the the center of the piston crown; a second flame deflecting surface, the second flame deflecting surface being defined by part of the second wall portion and aligned with (a) the location where the transfer port communicates with the combustion chamber and (b) the first flame deflecting surface.

A fourth aspect of the invention comes in the form of a method of operating an internal combustion engine characterized by the steps of: forming a combustible air-fuel mixture charge in a relatively small chamber which is fluidly communicated with a combustion chamber via a transfer port; inducing the charge to combust; directing a flame through the transport port into the combustion chamber into a cavity formed in the crown of the piston; deflecting the flame using a first deflecting surface while the piston is relatively close to its TDC position; and deflecting the flame using a second deflecting surface when the piston has descended from its TDC position by a given amount.

DESCRIPTION OF THE PREFERRED EMBODIMENTS

Figure 2:
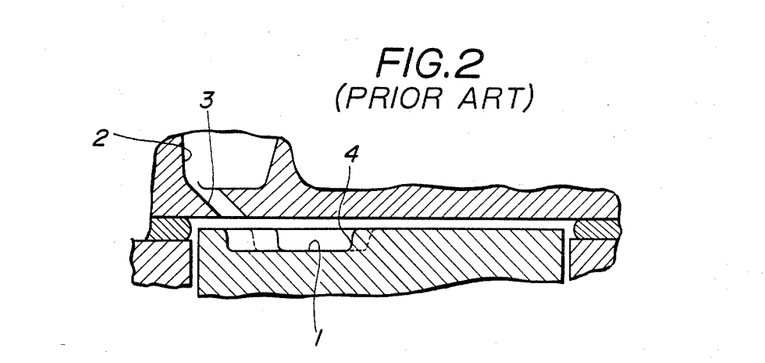
FIG. 2 is a section taken along section line II—II of FIG. 1.
Figure 3:
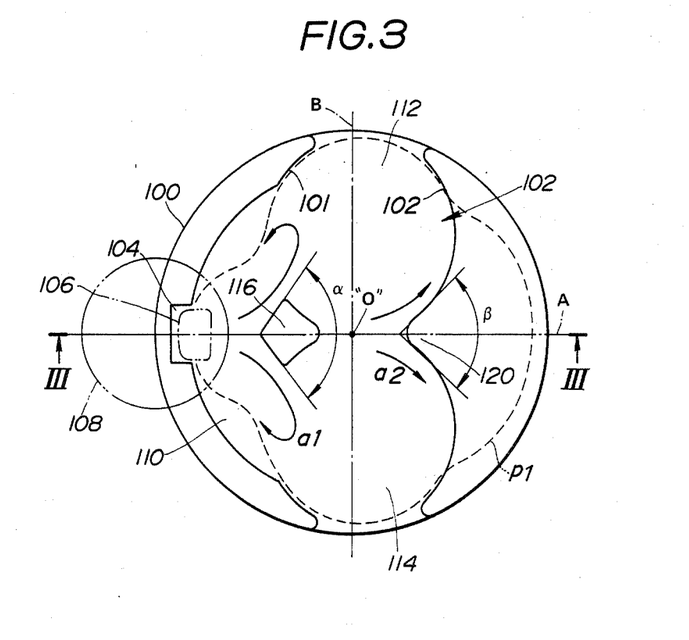
FIGS. 3 and 4 are plan and sectional elevation views of a first embodiment of the present invention.
Figure 4:
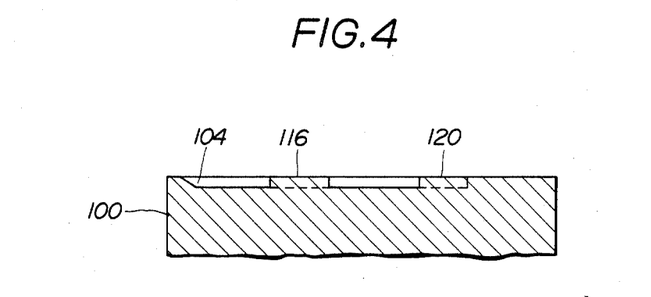

FIGS. 3 and 4 show a first embodiment of the present invention. In this arrangement the piston 100 is formed with a unique flame dispersing cavity in the crown thereof. The cavity defines two opposed shaped walls 101 and 102. The cavity is relatively shallow as compared with the prior art arrangement shown in FIGS. 1 and 2 of the drawings. This prevents the loss of compression which would otherwise be experienced if the volume of the cavity were to be made excessively large.

To facilitate description of the configuration and arrangement of the various portions of this cavity 102 reference will be made to first and second lines A and B which extend along diameters of the piston, which are normal to one and other and which intersect at the center "O" of the crown.

In this embodiment the cavity 102 includes a short trench portion 104 which opens into the wall 101 and is aligned with line A. This trench portion is formed so that one end thereof is located proximate the perimeter of the piston 100 and below the mouth of the transfer port 106 which interconnects the main combustion chamber with a swirl chamber 108.

The portions of the first wall 101 on either side of the trench 104 define a first approximately crescent shaped expansion portion or zone 110 which is symmetrical with respect to the line A and which blends with the trench 104 at a location just below the mouth of the transfer port 106.

Second and third dispersion portions or zones 112, 114 which have essentially circular shapes and which overlap each other and the first portion 110 are such as to be arranged symmetrically with respect to line A and essentially aligned with respect to to line B.

An island-like deflection portion 116 is located amid the first, second and third recess portions or zones 110, 112, 114 and arranged to project up at a site which is located on the first line A and between the mouth of the transfer port 106 and the center "O" of the piston 100. This deflection portion 116 is arranged to be in the path of the flame which is ejected from the transport port 106 during the initial stage of the expansion phase while the piston 100 is still located relatively close to its TDC position. The upstream side of portion 116 is arranged to have angled (V shaped) faces directed into the path of the flame flow and which are designed to induce a first splitting or division of the same. The two faces of this portion 116 are arranged at a first angle "alpha".

A second flame splitting or deflecting portion is defined by a V shaped nose-like portion 120 which forms part of the second wall 103 and which tend to project between the second and third circular dispersion portions 112, 114. The faces of this nose are arranged to define a second angle "Beta". According to the present invention angle "alpha" is preferably larger than angle "Beta".

It will be noted that second and third portions or zones 112 and 114 extend to the very edge of the piston 100 in a manner as shown.

For disclosure relating to a cavity wherein the essentially circular flame dispersing portions extend all the way to the periphery of the piston in a manner similar to the above, reference may be had to U.S. Pat. No. 4,662,330 in the name of Giichi Shiyoyama et al. This reference discloses a cavity arrangement which reduces the adverse effect of flows created by a reverse squish phenomenon on the desired swirl patterns in the combustion chamber in the area of the flame dispersing portions which flank the trench portion, by permitting the reverse squish induced flows to encounter the bore wall. The content of this document is hereby incorporated by reference thereto.

The operation of the above disclosed arrangement is such that the flame which flows out of the transport port 106 during the expansion phase of the engine flows toward and strikes against the first deflecting portion 116. This tends to induce part of the flame to curl out and back such as shown by the curled arrows a1. Subsequently, as the piston 100 descends to the zone at which the flame from the transfer port 106 initially impinges on the piston crown moves from upstream of the first flame deflecting portion 116 toward the center of the piston and the second flame splitting portion 120. Thus, upon a given amount of descent of the piston 100 from its TDC position the flame undergoes splitting by the second flame deflecting portion 120 in a manner as indicated by the arrows a2.

This dual stage splitting of the flame flow tends to produce a plume of the nature traced out by broken line P1 122. As will be appreciated this plume is more extensive than that achieved with the prior art and more rapidly engulfs a much larger volume of the air available in the main combustion chamber thus promoting more complete and rapid combustion of the fraction of fuel which is permitted to enter thereinto prior the beginning of the expansion phase along with the uncombusted fraction which is entrained in the burning gases constituting the flame which ejects from the transfer port. This reduces HC emissions at low load and smoke at high loads.

It is within the scope of the present invention to form the piston and the elements which define the cavity integrally or selectively form given parts of ceramic material and the remainder of metal.

Figure 5:
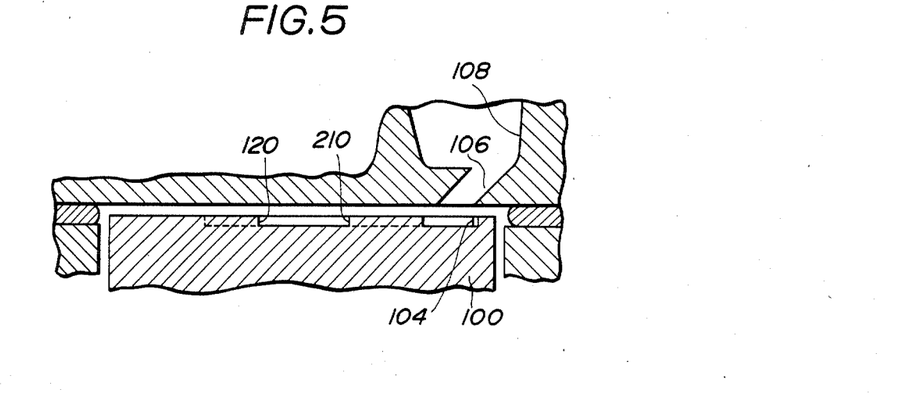
FIGS. 5 and 6 are a sectional elevation and a plan view of a second embodiment of the present invention.
Figure 6:
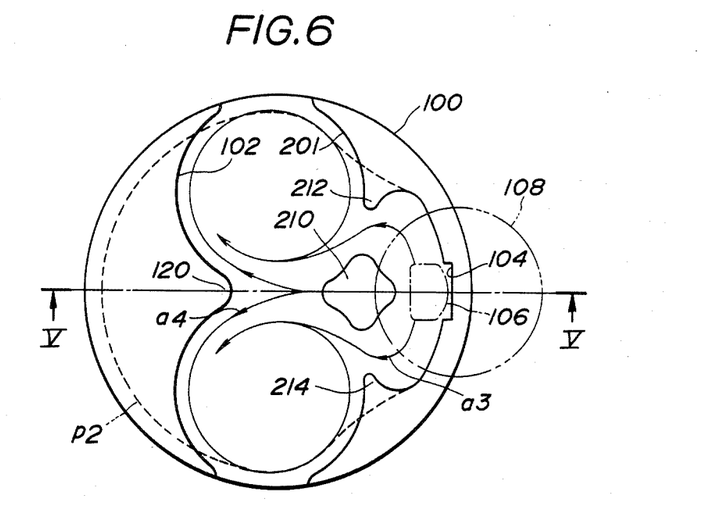

FIGS. 5 and 6 show a second embodiment of the present invention. In this arrangement the trench portion 104 is shorter than in the case of the first embodiment and the first flame deflecting member 210 is arranged to have four lobes interconnected by slightly concave walls. The first or upstream lobe is oriented to face toward the trench 104, the two lateral lobes are oriented essentially normally with respect to line A while the downstream lobe faces the nose-like second flame deflecting portion 120.

The first wall is formed with two inwardly directed finger-like flow guides 212, 214 which in this embodiment are arranged to project in the general direction of the downstream lobe of the second deflection member 120.

In operation when the flame first ejects from the transfer port 106 it strikes against the upstream lobe of the first flame deflecting portion 210. At this time the flame tends to be split into two flows. These flows are guided by the central flow guides 212, 214 back in toward the center of the piston 100 whereafter they tend to swirl about in essentially circular flow patterns as shown by arrows a3. After the piston 100 descends beyond a predetermined amount the flame passes over the top of the first deflecting portion and undergoes deflection by the second nose-like deflecting portion. The flame at this time is induced to flow as indicated by arrows a4. As will be noted the swirling patterns in the essentially circular flame dispersing zones 112, 114 tend to be maintained by the second deflection.

A plume P2 having a shape essentially depicted by the chain line tends to be developed.

Figure 7:
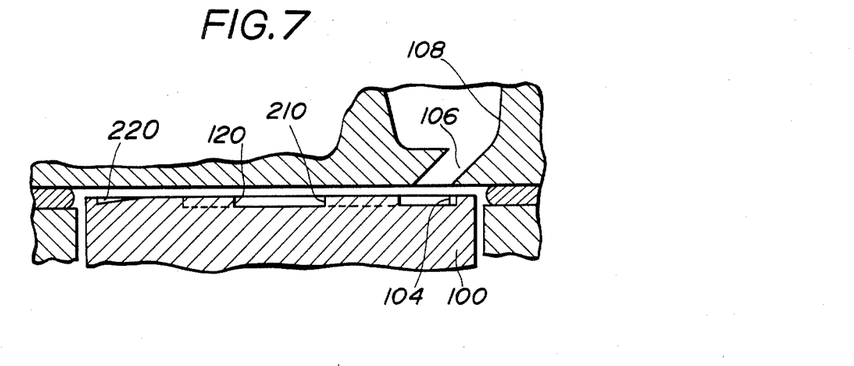
FIGS. 7 and 8 and 9 and 10 show third and fourth embodiments of the present invention, respectively.
Figure 8:
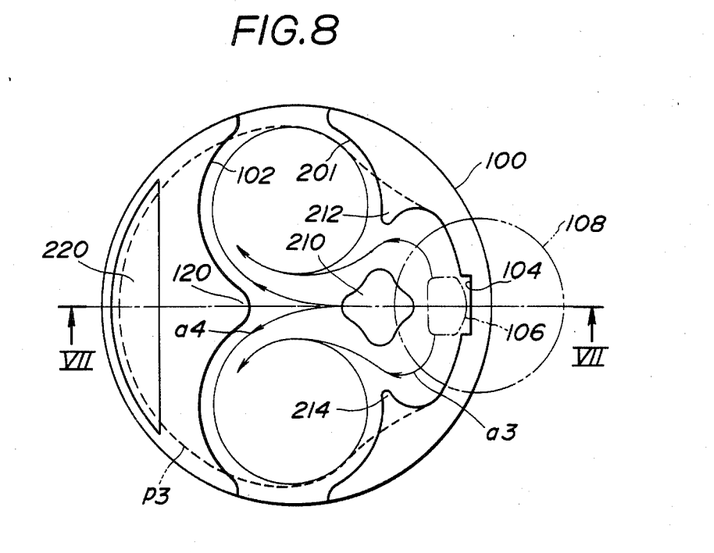

FIGS. 7 and 8 show a third embodiment of the present invention. This embodiment is essentially the same as the second one and differs in that a crescent moon-shaped recess 220 is formed proximate the perimetric edge of the piston crown. This recess is arranged distal from and essentially diametrically with respect to the transfer port 106. This recess reduces the amount of burning gas which is permitted to encounter the relatively cool bore wall and undergo quenching and thus functions to suppress the concentration of HC in the exhaust of the engine.

Figure 9:
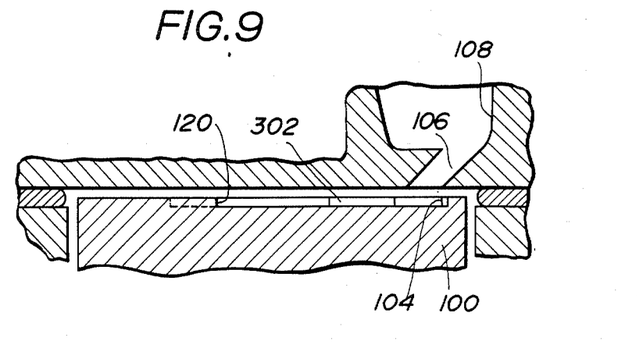
Figure 10:
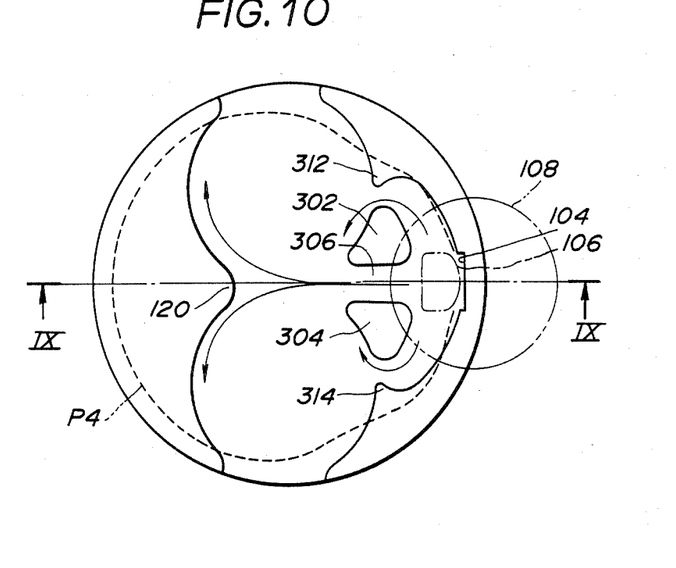

FIGS. 9 and 10 show a fourth embodiment of the present invention. In this embodiment the first flame deflecting portion is comprised of two essentially mirror image sections 302, 304 which are arranged symetrically with respect to line A and which define a passage 306 therebetween. In this embodiment the passage 306 is arranged to have a width less than that of the transfer port 106. Accordingly, the passage of flame therethrough is throttled and induces the formation of two side flows. These side flows are redirected by flow guides 312, 314 in a manner which tends to reblend the same with the flow which has passed directly between the projections and has flow directly toward the second deflecting portion 120. In this embodiment the flow guides 312, 314 are focussed just downstream of the two sections.

A well developed plume P4 such as indicated by the chain line is induced by this arrangement.

What is claimed is:

1. In an internal combustion engine
   a piston reciprocatively disposed in a bore to define a variable volume combustion chamber; and
   a chamber into which fuel is supplied, said chamber being fluidly communicated with the combustion chamber by a transfer port; said piston comprising:
   a first flame deflecting surface defined in a cavity formed in the crown of said piston, said first flame deflecting surface being located in the path of a flame which is ejected from said transfer port while said piston is relatively close to a TDC position;
   a second flame deflecting surface, said second flame deflecting surface being defined in the cavity and comprises a portion of a peripheral wall defining said cavity, said second flame deflecting surface being positioned directly opposite said transfer port and located in the path of said flame after said piston has descended from said TDC position by a given amount, said first flame deflecting surface being arranged with respect to said second flame deflecting surface so that while said piston is close to TDC said first flame deflecting surface is interposed between said transfer port and said second flame deflecting surface whereby only said first flame deflecting surface deflects the flame which issues from said transfer port until such time as the piston has descended by said given amount.

2. An engine as claimed in claim 1 further comprising a second shaped cavity, said second shaped cavity being formed in the crown of said piston and located essentially diametrically with respect to the location whereat said transfer port opens into said combustion chamber and so that said first and second flame deflecting portions are located between it and said location.

3. An engine as claimed in claim 1 wherein said first deflecting surface has an essentially V shape having a first predetermined included angle and wherein said second deflecting surface has an essentially V shape having a second predetermined included angle, said second predetermined angle being smaller than said first predetermined angle.

4. An engine as claimed in claim 1 wherein said cavity further includes:
   a first essentially crescent shaped recess portion;
   a trench which blends with said first recess portion, said trench having an end located proximate the perimeter of said piston and below the location said transfer port opens into said combustion chamber;
   second and third essentially circular recess portions which blend with each other and said first recess portion, said first and second recess portions respectively extending to the edge of the piston crown.

5. An engine as claimed in claim 4 wherein said trench is aligned with a diameter line of the piston crown, said first and second deflecting surfaces are aligned on the same diameter line, said first and second deflecting surfaces being located on opposite sides of a second diameter line which normally intersect the first one, and said second and third essentially circular recess portions are arranged so as to be essentially symmetrical with respect to said first diameter line and so that the centers thereof are located proximate said second diameter line.

6. An engine as claimed in claim 1 wherein said cavity is defined between first and second shaped wall sections.

7. An engine as claimed in claim 1 wherein a portion of said peripheral wall nearest to said transfer port includes first and second protrusions directed inwardly towards said first deflecting surface so as to redirect said flame to the center of the piston after the flame is split by said first deflecting means.

8. In an internal combustion engine:
   a piston reciprocatively disposed in a bore to define a variable volume combustion chamber;
   a chamber into which fuel is supplied, said chamber being fluidly communicated with the combustion chamber by a transfer port;
   a cavity formed in a crown of the piston, said cavity comprising:
   means defining a first flame deflecting surface, said first flame deflecting surface being located between the center of the piston and the location whereat said transfer port opens into said combustion chamber; and means defining a second flame deflecting surface comprising a portion of a peripheral wall defining said cavity, said second flame deflecting surface being positioned directly opposite said transfer port, said second flame deflecting surface being aligned with the location where said transfer port communicates with said combustion chamber and said first flame deflecting surface and more distal from said location than said first flame deflecting surface, said first flame deflecting surface being interposed between said transfer port and said second flame deflecting surface when said piston is close to TDC, said second flame deflecting surface being arranged to be exposed to a flame which ejects from said transfer port only after said piston has descended from TDC by a predetermined amount.

9. An engine as claimed in claim 8 wherein a portion of said peripheral wall nearest to said transfer port includes first and second protrusions directed inwardly towards said first deflecting surface so as to redirect said flame to the center of the piston after the flame is split by said first deflecting means.

10. In an internal combustion engine
a piston reciprocatively disposed in a bore to define a variable volume combustion chamber;
a chamber into which fuel is supplied, said chamber being fluidly communicated with the combustion chamber by a transfer port;
a cavity formed in the crown of the piston, said cavity being defined between first and second shaped wall portions comprising:
a first flame deflecting surface, said first flame deflecting surface being located between the center of the piston and the location whereat said transfer port opens into said combustion chamber;
first and second flame guides which form part of said first shaped wall portion, said flame guides being oriented inwardly to deflect the flame which has been deflected by said first flame deflecting surface back in toward the the center of the piston crown; and
a second flame deflecting surface, said second flame deflecting surface being defined by part of said second wall portion and aligned by (a) the location where said transport communicates with said combustion chamber and (b) said first flame deflecting surface.

11. An engine as claimed in claim 10 wherein said first deflecting surface includes first and second sections which define a channel therebetween, said channel being oriented toward said second flame deflecting surface.

12. An engine as claimed in claim 11, wherein said channel is narrower than the width of said transfer port.

13. A method of operating an internal combustion engine comprising the steps of:
forming a combustible air fuel mixture charge in a pre-chamber which is fluidly communicated with a combustion chamber via a transfer port;
inducing the charge to combust;
directing a flame through said transfer port into said combustion chamber into a cavity formed in the crown of the piston;
deflecting the flame using only a first deflecting surface while the piston is relatively close to a TDC position; and
deflecting the flame using a second deflecting surface when the piston has descended from said TDC position by a given amount wherein said first deflecting surface is no longer interposed between said transfer port and said second deflecting surface.

14. A method as claimed in claim 13 further comprising the step of permitting a small amount of fuel to escape from the chamber into the combustion chamber prior to the combustion induction step.

15. In an internal combustion engine
a piston reciprocatively disposed in a bore to define a variable volume combustion chamber; and
a chamber into which fuel is supplied, said chamber being fluidly communicated with the combustion chamber by a transfer port; said piston comprising:
a first flame deflecting surface defined in a cavity formed in the crown of said piston, said first flame deflecting surface being located in the path of a flame which is ejected from said transfer port while said piston is relatively close to a TDC position;
a second flame deflecting surface, said second flame deflecting surface being defined in the cavity and comprises a portion of a peripheral wall defining said cavity, said second flame deflecting surface being positioned directly opposite said transfer port and located in the path of said flame after said piston has descended from said TDC position by a given amount;
a second shaped cavity, said second shaped cavity being formed in the crown of said piston and located essentially diametrically with respect to the location whereat said transfer port opens into said combustion chamber and so that said first and second flame deflecting portions are located between it and said location.

16. An engine as claimed in claim 15 wherein a portion of said peripheral wall nearest to said transfer port includes first and second protrusions directed inwardly towards said first deflecting surface so as to redirect said flame to the center of the piston after the flame is split by said first deflecting means.

17. In an internal combustion engine
a piston reciprocatively disposed in a bore to define a variable volume combustion chamber; and
a chamber into which fuel is supplied, said chamber being fluidly communicated with the combustion chamber by a transfer port; said piston comprising:
a first flame deflecting surface defined in a cavity formed in the crown of said piston, said first flame deflecting surface being located in the path of a flame which is ejected from said transfer port while said piston is relatively close to a TDC position;
a second flame deflecting surface, said second flame deflecting surface being defined in the cavity and comprises a portion of a peripheral wall defining said cavity, said second flame deflecting surface being positioned directly opposite said transfer port and located in the path of said flame after said piston has descended from said TDC position by a given amount;
wherein said first deflecting surface has an essentially V shape having a first predetermined included angle and wherein said second deflecting surface has an essentially V shape having a second predetermined included angle, said second predetermined angle being smaller than said first predetermined angle.

18. An engine as claimed in claim 17 wherein a portion of said peripheral wall nearest to said transfer port includes first and second protrusions directed inwardly towards said first deflecting surface so as to redirect said flame to the center of the piston after the flame is split by said first deflecting means.

19. In an internal combustion engine
a piston reciprocatively disposed in a bore to define a variable volume combustion chamber; and
a chamber into which fuel is supplied, said chamber being fluidly communicated with the combustion chamber by a transfer port; said piston comprising:
a first flame deflecting surface defined in a cavity formed in the crown of said piston, said first flame deflecting surface being located in the path of a first flame which is ejected from said transfer port while said piston is relatively close to a TDC position;
a second flame deflecting surface, said second flame deflecting surface being defined in the cavity and comprises a portion of a peripheral wall defining said cavity, said second flame deflecting surface being positioned directly opposite said transfer port and located in the path of said flame after said piston has descended from said TDC position by a given amount;
wherein said cavity further includes:
a first essentially crescent shaped recess portion;
a trench which blends with said first recess portion, said trench having an end located proximate the perimeter of said piston and below the location said transfer port opens into said combustion chamber;
second and third essentially circular recess portions which blend with each other and said first recess portion, said first and second recess portions respectively extending to the edge of the piston crown.

20. An engine as claimed in claim 19 wherein said trench is aligned with a diameter line of the piston crown, the first and second deflecting surfaces are aligned on the same diameter line, said first and second deflecting surfaces being located on opposite sides of a second diameter line which normally intersect the first one, and said second and third essentially circular recess portions are arranged so as to be essentially symmetrical with respect to said first diameter line and so that the centers thereof are located proximate said second diameter line.

21. An engine as claimed in claim 19 wherein a portion of said peripheral wall nearest to said transfer port includes first and second protrusions directed inwardly towards said first deflecting surface so as to redirect said flame to the center of the piston after the flame is split by said first deflecting means.

* * * * *